United States Patent
Bibby

(10) Patent No.: US 8,424,379 B2
(45) Date of Patent: Apr. 23, 2013

(54) GOLF ACCESSORY FOR DETERMINING WIND STRENGTH AND DIRECTION

(76) Inventor: Henry R. Bibby, Scottsdale, AZ (US)

( * ) Notice: Subject to any disclaimer, the term of this patent is extended or adjusted under 35 U.S.C. 154(b) by 67 days.

(21) Appl. No.: 13/079,301

(22) Filed: Apr. 4, 2011

(65) Prior Publication Data

US 2012/0247201 A1 Oct. 4, 2012

(51) Int. Cl.
G01P 13/02 (2006.01)
G01K 13/02 (2006.01)
G01W 1/00 (2006.01)

(52) U.S. Cl.
USPC .............. 73/170.01; 73/170.04; 73/170.06; 116/214

(58) Field of Classification Search ... 73/170.01–170.07
See application file for complete search history.

(56) References Cited

U.S. PATENT DOCUMENTS

| 2,501,047 | A | | 10/1945 | Gustafsson et al. | |
|---|---|---|---|---|---|
| 3,658,719 | A | | 4/1972 | McConnaughey | |
| 4,423,626 | A | | 1/1984 | Herschede | |
| 5,186,118 | A | * | 2/1993 | Stinson | 116/214 |
| 5,958,585 | A | | 9/1999 | Meeks | |
| 6,848,302 | B1 | | 2/2005 | Williamson | |
| 7,290,445 | B2 | * | 11/2007 | Kirollos et al. | 73/170.04 |
| 7,765,863 | B1 | * | 8/2010 | Woolsey | 73/170.04 |
| 2008/0098952 | A1 | | 5/2008 | Healy et al. | |
| 2009/0217751 | A1 | * | 9/2009 | Onishi | 73/170.01 |
| 2010/0224119 | A1 | * | 9/2010 | Morris | 116/214 |

* cited by examiner

*Primary Examiner* — Andre Allen
(74) *Attorney, Agent, or Firm* — The von Hellens Law Firm, Ltd.

(57) ABSTRACT

A powder dispenser useable as a golf accessory includes a body of flexible material for housing a quantity of powder and a cap for controlling discharge of the powder. The cap includes an orifice for discharging the powder and a gate controlled by rotating the cap relative to the body to provide selective fluid communication with the powder within the body.

17 Claims, 3 Drawing Sheets

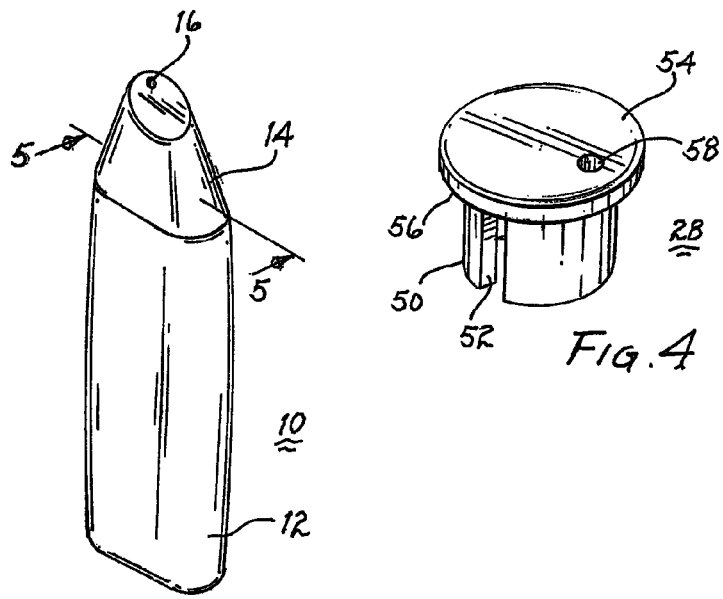
Fig. 1
Fig. 4
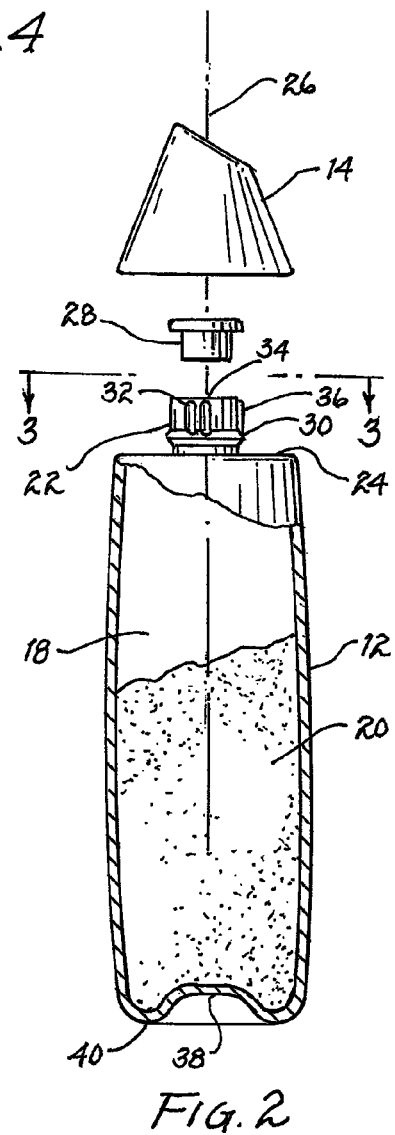
Fig. 2
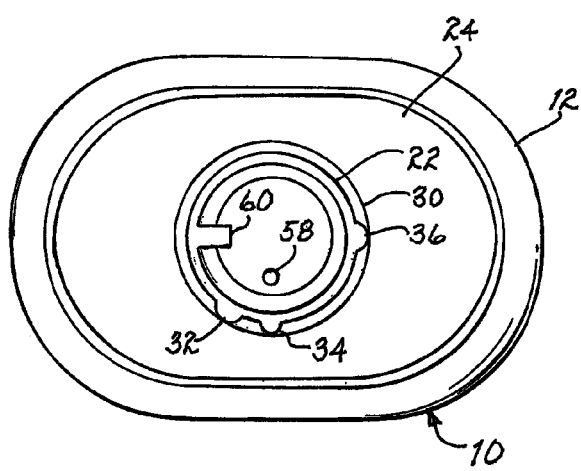
Fig. 3

GOLF ACCESSORY FOR DETERMINING WIND STRENGTH AND DIRECTION

BACKGROUND OF THE INVENTION

1. Field of the Invention

The present invention relates to golf equipment, and, more particularly, to apparatus for sensing the wind direction and velocity.

2. Description of Related Prior Art

The game of golf requires a golfer to hit a ball off the tee toward the green and ultimately sink the ball in a cup located somewhere on the green. The selection of a club for the tee shot and additional strokes toward the green is a function of the loft of the club and the speed of the club head at the point of impact with the ball. Any wind present will affect the decision of which club to use as a function of the loft of the club head in order to take advantage of a tailwind and minimize the effect of a headwind. Additionally, if the wind is from the left or the right, the direction of the intended trajectory of the ball will have to be adjusted to increase the likelihood that the ball will land on the fairway and not in the rough or in a bunker.

To provide information to a golfer about the wind direction and velocity, various procedures have been exercised. The simplest exercise is that of wetting one's finger and holding it vertically above one's head. The resulting evaporation of the fluid on one's finger will cool the finger facing the wind and a sense of direction of the wind can thereby be obtained. Additionally, the rapidity of cooling can be correlated to the velocity of the wind. Necessarily, this type of determination of the wind velocity and direction is a gross determination and not very accurate as it depends on multiple variables, including the sensitivity of the epidermis of the raised wetted finger.

Another procedure involves the golfer tossing blades of cut grass upwardly and watching the direction and speed of the grass as it descends. This determination is also a gross determination as the descent rate of the grass is a function of whether it is freshly cut blades of grass or dried blades of grass and the difference determines how long the grass remains airborne to provide an indication of the wind velocity and direction.

At some lies off the fairway, or even on the fairway, grass or other similar indicators may not be readily available to the golfer. A distant wind indicator, such as the pennant mounted on the pole extending from the cup in the green, is often too far away to provide an accurate indication translatable to the location of the golfer since the local wind will have different directions and velocities as a function of surrounding trees, structures and terrain.

SUMMARY OF THE INVENTION

The present invention is a dispenser for dispensing, on command, a puff of finely ground powder, preferably white. The puff of powder will float with the wind for a significant distance before descending to the ground. The direction and velocity of the puff of powder will provide an accurate indication of both the direction and velocity of the wind as the powder is carried by the wind. With this knowledge, the golfer would select a higher loft club to hit the ball on a higher trajectory and take advantage of a tailwind to obtain further distance. Alternatively, with a headwind, a lower loft club might be selected to reduce the effect of a headwind. These considerations are due in part to the fact that at ground level the wind is usually less strong than higher up. Were the wind coming from the left or the right, the golfer would adjust his/her stance to hit the ball somewhat into the wind to compensate for the wind.

It is therefore a primary object of the present invention to provide an indication to a golfer of the present wind velocity and direction.

Another object of the present invention is to provide an accessory useable by a golfer at any time anywhere along a golf course to obtain an indication of the wind velocity and direction.

Still another object of the present invention is to provide a dispenser for dispensing a puff of powder to inform a golfer of the wind velocity and direction.

Yet another object of the present invention is to provide a relatively small pocket portable dispenser for dispensing a puff of powder into the atmosphere.

Another object of the present invention is to provide an eco-friendly powder dispenser for use on a golf course to determine the wind velocity and direction.

Still another object of the present invention is to provide a golfer with a powder dispenser to mark the location of a ball on the green.

Yet another object of the present invention is to provide a golf bag transportable powder dispenser for use by a golfer to obtain a sense of the wind velocity and direction and to mark the location of his/her ball on a green.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is an isometric view of the powder dispenser;

FIG. 2 is a partial cross-sectional view of the powder dispenser;

FIG. 3 is an end view taken along lines 3-3, as shown in FIG. 2;

FIG. 4 illustrates an internal element serving as a gate for controlling the discharge of powder;

DESCRIPTION OF THE PREFERRED EMBODIMENT

Figure 5:
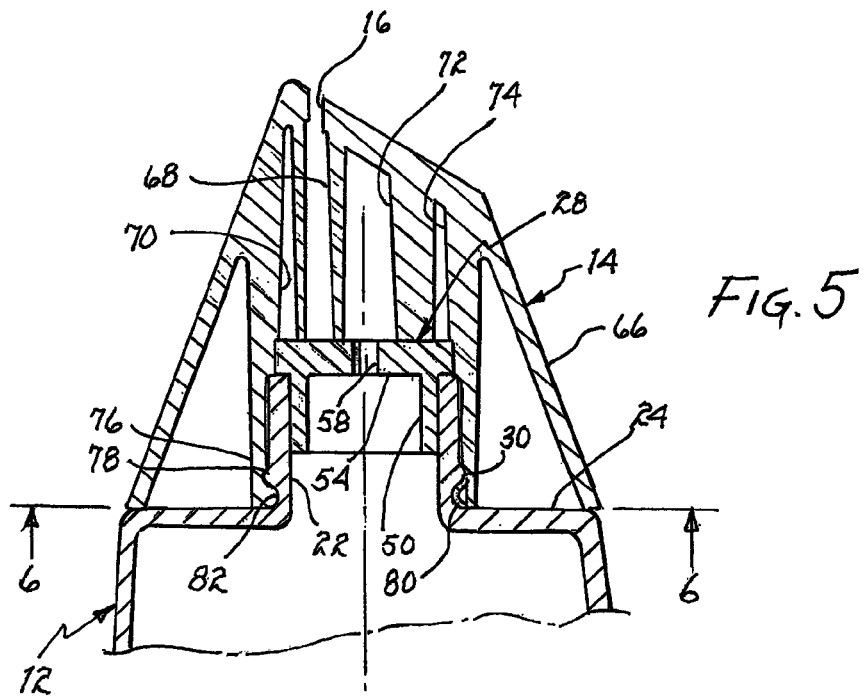
FIG. 5 is a cross-sectional view of the dispensing head of the powder dispenser in the closed position.

Referring to FIG. 1, there is illustrated a powder dispenser 10 particularly useful to a golfer to determine the direction and velocity of the prevailing wind prior to a golf shot. The dispenser includes a body 12 of flexible plastic and a rotatable cap 14 rotatable 90 degrees from the closed position shown to an open position. In the open position, powder may be dispensed from within body 12 through orifice 16 contained in cap 14 by momentarily squeezing the body. Upon dispensation of the powder, it will be carried by the wind to provide an indication of the direction of the wind and the velocity of the wind. This information is useful to a golfer to plan and execute the next golf shot.

Referring jointly to FIGS. 2 and 3, powder 20, such as talcum powder, or the like, of fine consistency is stored within body 12. Generally, an open space or cavity 18 exists between the top surface of powder 20 and end wall 24 of body 12. A cylindrical port 22 extends from end wall 24 to not only convey powder when the powder is expelled, but also to support cap 14 and accommodate 90 degree rotation of the cap relative to body 12 and generally about longitudinal axis 26. Gate 28 is non-rotatably lodged within cylindrical port 22. An annular ridge 30 extends about the cylindrical port to retain cap 14 mounted on body 12 yet accommodate rotation of the cap about the longitudinal axis. Ribs 32, 34 and 36 engage with a rib within cap 14 to restrain the cap in the closed position and yet accommodate 90 degree rotation of the cap relative to the body and about axis 26. The bottom of container 12 may be defined by a central depression 38 forming a peripheral ridge 40.

Referring jointly to FIGS. 3 and 4, gate 28 will be described in further detail. The gate includes a circular skirt 50 defining a slot 52. A disc 54 is disposed at the top of the skirt and extends diametrically from the perimeter of skirt 50 to define a lip 56 extending laterally from the skirt. A passageway 58 extends through the disc into fluid communication with the interior spaced defined by skirt 50. As particularly shown in FIG. 3, a land 60 extends radially inwardly from the cylindrical surface of port 22 for mating engagement with slot 52 in gate 28. Whereby, rotation of gate 28 relative to port 22 about axis 26 is precluded and the location of passageway 58 is fixed relative to body 12.

Figure 6:
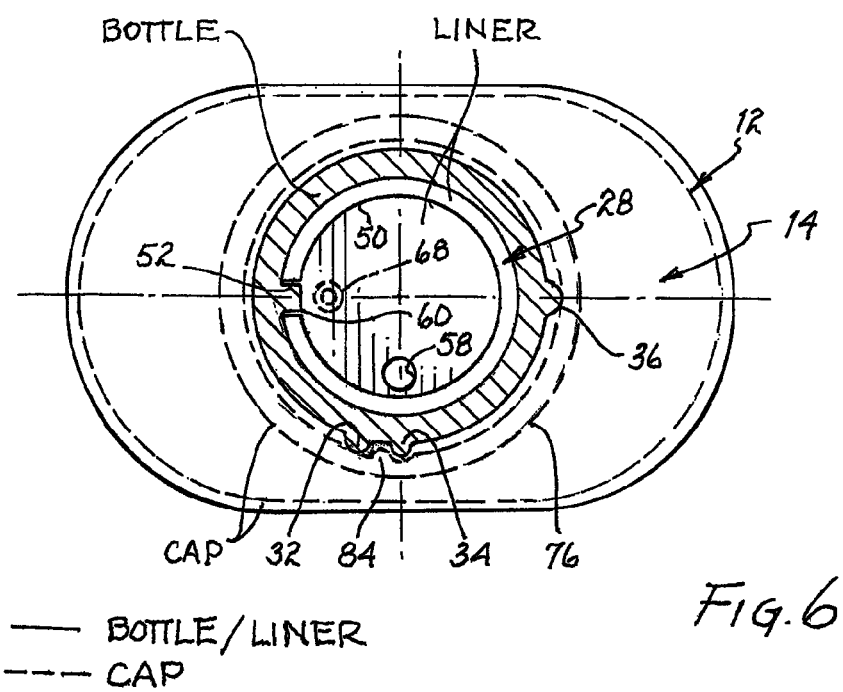
FIG. 6 is a cross-sectional view taken along lines 6-6, as shown in FIG. 5.

Referring jointly to FIGS. 5 and 6, details attendant cap 14 will be described. The cap includes a skirt 66 extending laterally and downwardly toward body 12. Orifice 16 interconnects with a passageway 68 through which the powder to be dispensed is channeled. Cavities 70, 72 and 74 are formed within the cap for manufacturing purposes and have little functional bearing. However, the ends of the walls thereof serve as means for preventing movement of the gate along the longitudinal axis. Cylindrical section 76 within cap 14 may include an annular detent 78 for receiving annular ridge 30. Additionally, an annular ridge 80 is located about the lower end of cylindrical section 76 for engagement with an annular space 82 disposed intermediate annular ridge 30 and end wall 24. Thereby, a snapfit engagement is provided between port 22 and cylindrical section 76. As particularly illustrated in FIG. 5, disc 54 closes the bottom end of passageway 68 to prevent communication between the passageway and the interior of body 12. As particularly shown in FIG. 6, a rib 84 is disposed on the inner surface of cylindrical section 76 for engagement intermediate ribs 32 and 36 when cap 14 is in the closed position.

Figure 7:
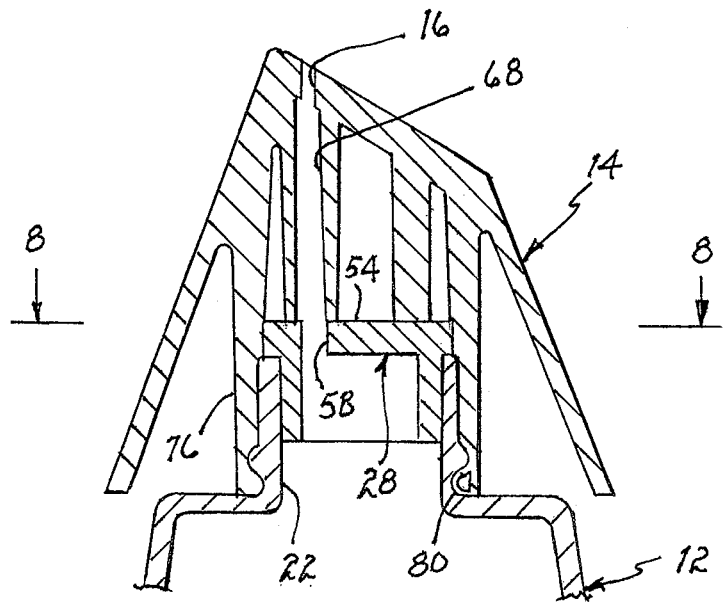
FIG. 7 is a cross-sectional view of the dispensing head of the powder dispenser in the open position.
Figure 8:
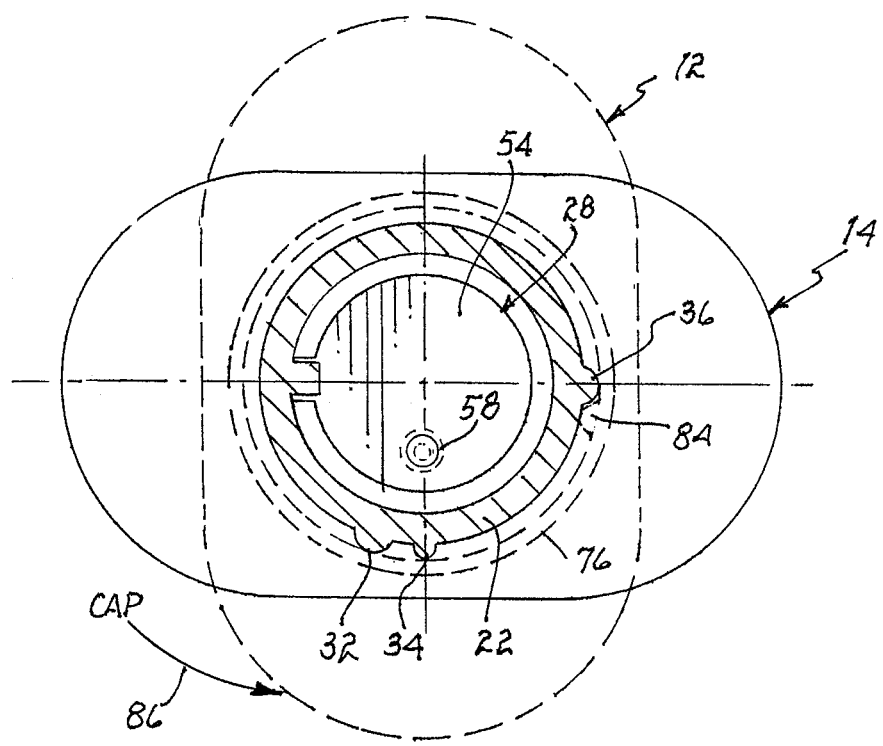
FIG. 8 is a cross-sectional view taken along lines 8-8, as shown in FIG. 7.

Referring to FIGS. 7 and 8, cap 14 is shown as having been rotated 90 degrees relative to body 12 to provide fluid communication between the interior of body 12 and passageway 68 leading to orifice 16. As the cap is manually rotated about longitudinal axis 26 (see FIG. 2), rib 84, extending from cylindrical section 76 is forced past rib 34 extending from port 22 to a position essentially adjacent rib 36. As illustrated, the depth of rib 34 is preferably less than the depth of either ribs 32 and 36 to facilitate translation of rib 84 past rib 34. The depth of ribs 32 and 36 is sufficient to prevent translation of rib 84 past either of ribs 32 or 36. The combination of rib 84 and ribs 32, 34 and 36 serve in the manner of a detent or detent means. Upon rotation of cap 14, passageway 68 will become coincident with passageway 58 in disc 54 of gate 28. As reflected by arrow 86, movement of cap 14 relative to body 12 is essentially in the counter-clockwise direction to establish fluid communication between the interior of body 12 and orifice 16 in the cap. To close powder dispenser 10, cap 14 is rotated in a clockwise direction whereby disc 54 closes the lower end of passageway 68 within the cap and dispensation of powder will be precluded.

To operate the powder dispenser, a user simply rotates the cap 90 degrees in the counter-clockwise direction to establish fluid communication between the interior of body 12 and orifice 16. Upon squeezing of the flexible body, powder is forced into passageway 68 and expelled from the orifice. The expelled powder will be blown by the wind to indicate the direction of the wind as well as its velocity. Thereafter, a golfer may select the appropriate club to take advantage of or compensate for the prevailing tail wind, depending upon its direction and velocity.

When the golfballs of two or more golfers are on the green, it is conventional for a golfer whose ball may interfere with the putt of a golfer whose ball is further away to mark the location of his/her ball and pick it up. Conventionally, a coin or the like is used to mark the location of such a picked up ball. The powder dispenser may be used for this purpose by squeezing the body after cap 14 has been rotated 90 degrees and deposit a puff of powder coincident with the location of the picked up ball.

I claim:

1. A powder dispenser useable as a golf accessory for an indication of the direction and velocity of the wind, said powder dispenser comprising:
   a) a body for housing a quantity of powder, including a cylindrical port defining the outlet of said body;
   b) a cap for selectively accommodating discharge of the powder through an orifice, including a cylindrical section for engaging said port;
   c) an openable and closeable gate interconnecting said cap with said port for selectively accommodating fluid communication of the powder from within said body and through said orifice; and
   d) detent means for accommodating limited rotation of said cap relative to said body to open and close said gate.

2. The powder dispenser as set forth in claim 1 wherein said cylindrical section of said cap encircles said port of said body.

3. The powder dispenser as set forth in claim 1 wherein said cap includes a passageway in fluid communication with said orifice and wherein said gate includes a fixedly located disc having a passageway extending therethrough, said passageway in said cap being located coincident with said passageway in said disc upon rotation of said cap relative to said body.

4. The powder dispenser as set forth in claim 3 wherein said gate includes a skirt extending from said disc for insertion within said port and including a land extending radially inwardly from said port for engagement with a slot in said skirt to prevent relative rotational movement between said skirt and said port.

5. A powder dispenser having a longitudinal axis for use as a golf accessory, said powder dispenser comprising:
   a) a squeezable body for housing a quantity of powder;
   b) a cap for selectively discharging a quantity of powder from within said body upon rotation of said cap relative to said body and through an orifice upon squeezing said body;
   c) said body including an opening in the form of a cylindrical port and a gate located in said port for controlling flow of the powder from within said body through said orifice, said gate including an aperture;
   d) said cap including a cylindrical section mating with said port and a passageway extending from said orifice; and
   e) detent means for selectively rotating said cap relative to said body to align said passageway with said aperture in said gate to control fluid communication between said body and said orifice and accommodate a flow of a quantity of powder from within said body through said orifice upon rotation of said cap.

6. The powder dispenser as set forth in claim 5 including a snap fitting interconnecting said cylindrical section with said port.

7. The powder dispenser as set forth in claim 6 wherein said snap fitting includes an annular ridge extending laterally about said port and an annular detent disposed in said cylindrical section for receiving said annular ridge.

8. The powder dispenser as set forth in claim 6 wherein said body includes an end wall supporting said cylinder and said snap fitting includes an annular ridge about said port a distance from said end wall and wherein said cylindrical section includes an annular ridge disposed at the lower end of said cylindrical section for engaging said port intermediate said end wall and said annular ridge disposed about said port.

9. The powder dispenser as set forth in claim 5 including a pair of spaced apart ribs extending longitudinally from said port and said cylindrical section and including a further rib extending longitudinally inwardly from said cylindrical section and disposed intermediate said pair of ribs for limiting rotational movement about the longitudinal axis of said further rib between said pair of ribs.

10. The powder dispenser as set forth in claim 9 including a yet further rib disposed intermediate said pair of ribs serving as a detent for urging said further rib adjacent one rib of said pair of ribs.

11. The powder dispenser as set forth in claim 9 wherein said pair of ribs and said further rib restrict rotational movement of said cap to 90 degrees (90°) about the longitudinal axis.

12. The powder dispenser as set forth in claim 5 wherein said port includes a land extending radially inwardly from said port, said gate including a skirt having a slot for receiving said land to preclude rotation of said gate about the longitudinal axis and to maintain the position of said aperture upon rotation of said cap.

13. The powder dispenser as set forth in claim 12 wherein said skirt depends from a disc having a lip for bearing against the end of said port.

14. The powder dispenser as set forth in claim 5 wherein said cap includes a skirt defining the exterior surface of said cap.

15. The powder dispenser as set forth in claim 5 wherein said cap includes means for preventing longitudinal movement of said gate out of said port.

16. The powder dispenser as set forth in claim 5 wherein said body includes a bottom and said bottom includes a central depression.

17. The powder dispenser as set forth in claim 5 wherein said body is formed of flexible plastic.

\* \* \* \* \*